Dec. 24, 1974

D. J. BRIDGEFORD

Re. 28, 281

METHOD OF COATING THE INTERIOR OF A SAUSAGE CASING

Original Filed Nov. 22, 1965

4 Sheets-Sheet 1

DOUGLAS J BRIDGEFORD

INVENTOR.

BY Neal J. Moseley his Attorney

METHOD OF COATING THE INTERIOR OF A SAUSAGE CASING

Original Filed Nov. 22, 1965

4 Sheets-Sheet 2

DOUGLAS J BRIDGEFORD

INVENTOR.

BY Neal J. Mozely his Attorney

METHOD OF COATING THE INTERIOR OF A SAUSAGE CASING

Original Filed Nov. 22, 1965

4 Sheets-Sheet 3

DOUGLAS J BRIDGEFORD
INVENTOR.

BY Neal J. Moseley
his Attorney

DOUGLAS J. BRIDGEFORD
INVENTOR.

BY Henry J. Mozely
his Attorney

United States Patent Office

Re. 28,281
Reissued Dec. 24, 1974

28,281

METHOD OF COATING THE INTERIOR OF A SAUSAGE CASING

Douglas J. Bridgeford, Champaign, Ill., assignor to Tee-Pak, Inc., Chicago, Ill.

Original No. 3,451,827, dated June 24, 1969, Ser. No. 509,117, Nov. 22, 1965. Application for reissue June 21, 1971, Ser. No. 155,368

Int. Cl. A22c *13/00*

U.S. Cl. 117—96 10 Claims

Matter enclosed in heavy brackets [ ] appears in the original patent but forms no part of this reissue specification; matter printed in italics indicates the additions made by reissue.

ABSTRACT OF THE DISCLOSURE

A thin-walled continuous tube of indefinite lengths is coated internally by shirring said tube on a mandrel having a longitudinal passage while introducing a solution, emulsion, or dispersion of an adherent coating material in a liquid carrier through said mandrel to coat the interior of the tube. *The coating is applied as a solution, emulsion, or dispersion of a coating material in a liquid carrier comprising water, an organic solvent, or a mixture such as aqueous glycerol. Coating materials which are not soluble may be dispersed in the liquid carrier using any suitable surfactant. A coating addon of 30–90 drops is disclosed for an 84 foot shirred strand.*

Figure 1:
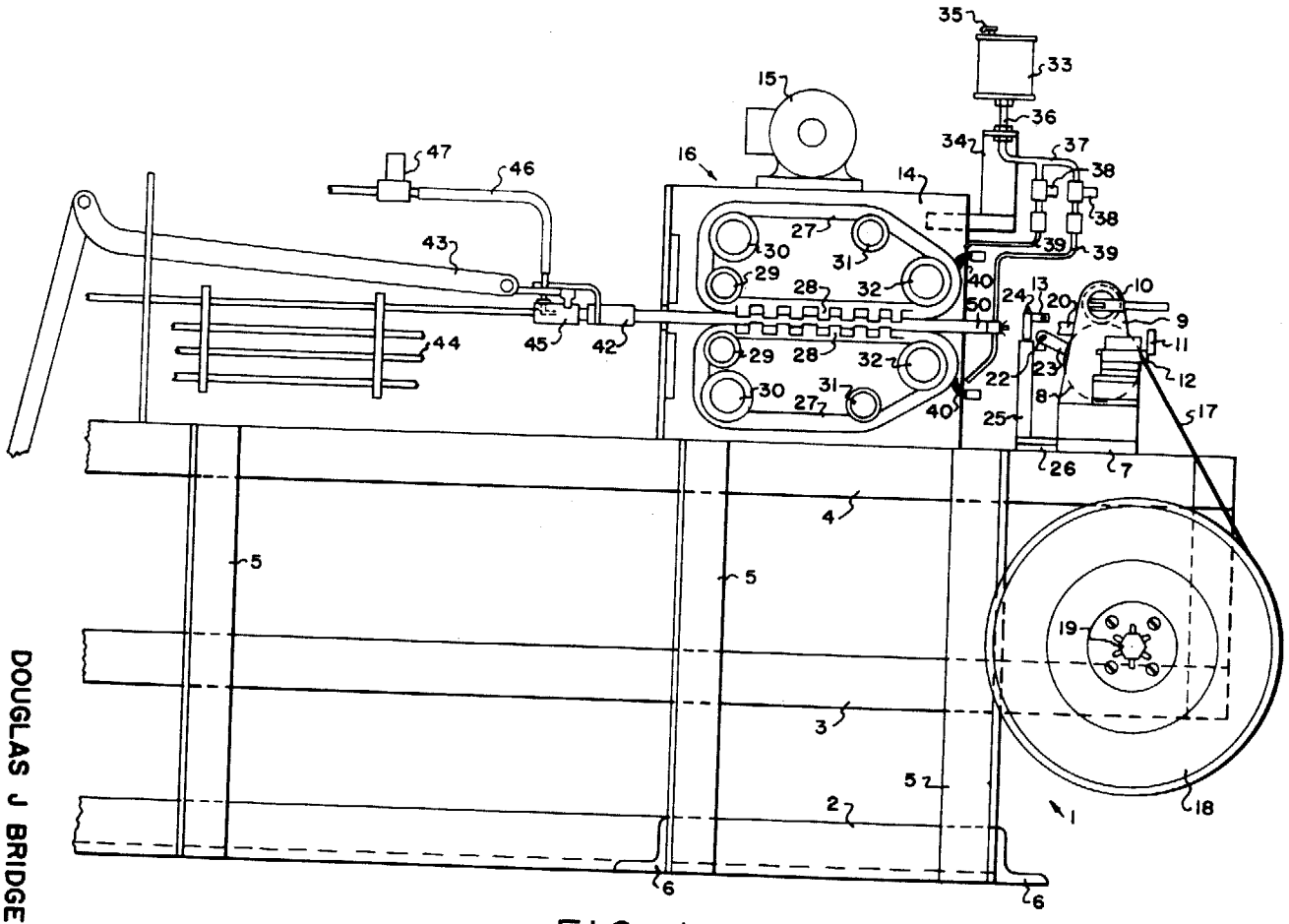

This invention relates to new and useful improvements in methods and apparatus for coating the inside of small diameter thin-walled flexible tubes.

Thin-walled small diameter tubes of plastic are made for a variety of purposes. Thin-walled small diameter tubes of regenerated cellulose (with or without fibrous reinforcement), cellulose derivatives, amylose, alginates, collagen, etc., are well known for use as flexible molds or casings for the formation of sausages. In many applications it is desirable to provide inside coatings to thin-walled hollow tubes, especially casings, such as, moisture-proofing or anti-blocking materials, release agents, synthetic smokes, antibiotics, bacteristats, perfumes, dyes, pigments, etc. In larger diameter tubes it is possible to coat the inside of a tube by filling a portion of the tube with the desired coating material and then moving the tube so that the slug of coating material confined within the tube is moved in relation to the tube wall and thus coats the inside wall of the tube over an extended distance. This internal coating technique is theoretically capable of application to tubes of all sizes. However, in commercial practice it has been uneconomical to apply the internal coating technique above described to small size tubings and casings.

Accordingly, it is one object of this invention to provide a new and improved method for the internal coating of thin-walled tubes.

Another object of this invention is to provide a new and improved method for coating the inside of thin-walled flexible tubes of relatively small diameter.

Another object of this invention is to provide a new and improved apparatus for coating the inside of thin-walled flexible tubes.

A feature of this invention is the provision of an improved method for coating the inside of flexible wall tubes while shirring or pleating a predetermined length of the tube.

Another feature of this invention is the provision of a new and improved apparatus for coating the inside wall of thin-walled tubes, especially tubes of small diameter, while shirring or pleating a predetermined length of the tube.

Other objects and features of this invention will become apparent from time to time throughout the specification and claims as hereinafter related.

This invention comprises a new and improved method for the internal coating of thin-walled tubes while shirring or pleating a predetermined length of the tube. Many years ago, thin-walled tubes such as natural or artificial sausage casings were shirred or pleated into relatively short easily handled lengths by moving the tube over a hollow mandrel, inflating the tube around the mandrel, and shirring or pleating the tube by hand on the mandrel. Later, machines were designed, such as that shown in Dietrich U.S. Patent 2,010,626, which replaced the fingers of a hand shirring operator with mechanically operated dogs or lugs which would engage an inflated tubing and move it to form an accordion pleated or shirred product. Improved forms of shirring machines and the products produced thereby are shown in Korsgaard U.S. Patent 2,583,654; Blizzard et al. U.S. Patents 2,722,714, 2,722,715, and 2,723,201; Gimbel U.S. Patent 2,819,488; and, Matecki U.S. Patents 2,983,949 and 2,984,574. This invention is based upon the discovery that a variety of coating materials, viz. any material which will form a coherent continuous coating, can be applied uniformly on the internal surface of a hollow tube by application through a hollow mandrel onto which the hollow tubing or casing is shirred. The coating material may be applied through the hollow mandrel of any of the several shirring machines described in the various patents mentioned above, or through a hollow mandrel onto which a casing is shirred by hand. Generally, the coating material must be introduced with the air or other gas which is blown into the hollow tube to keep it inflated during the shirring process.

Figure 2:
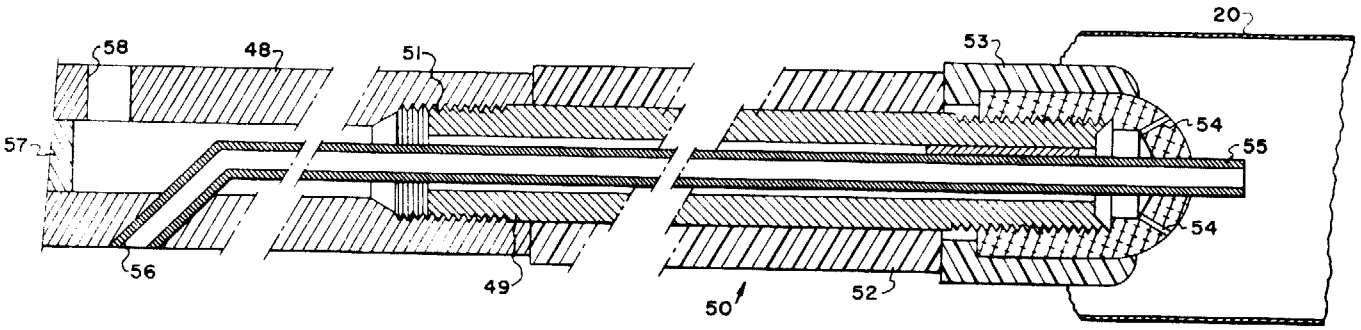
Figure 3:
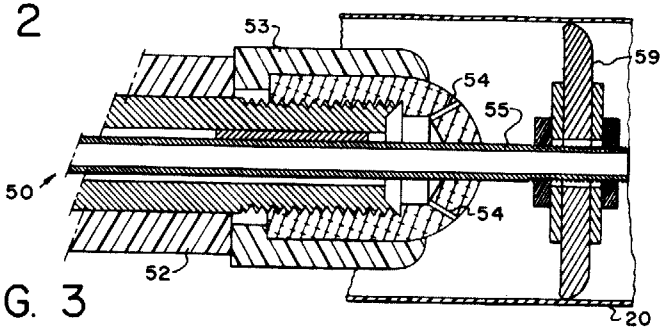
Figure 4:
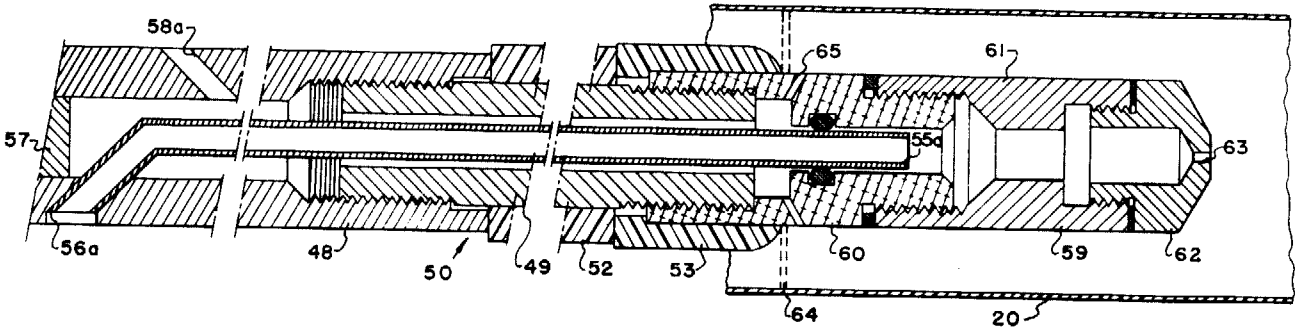
Figure 5:
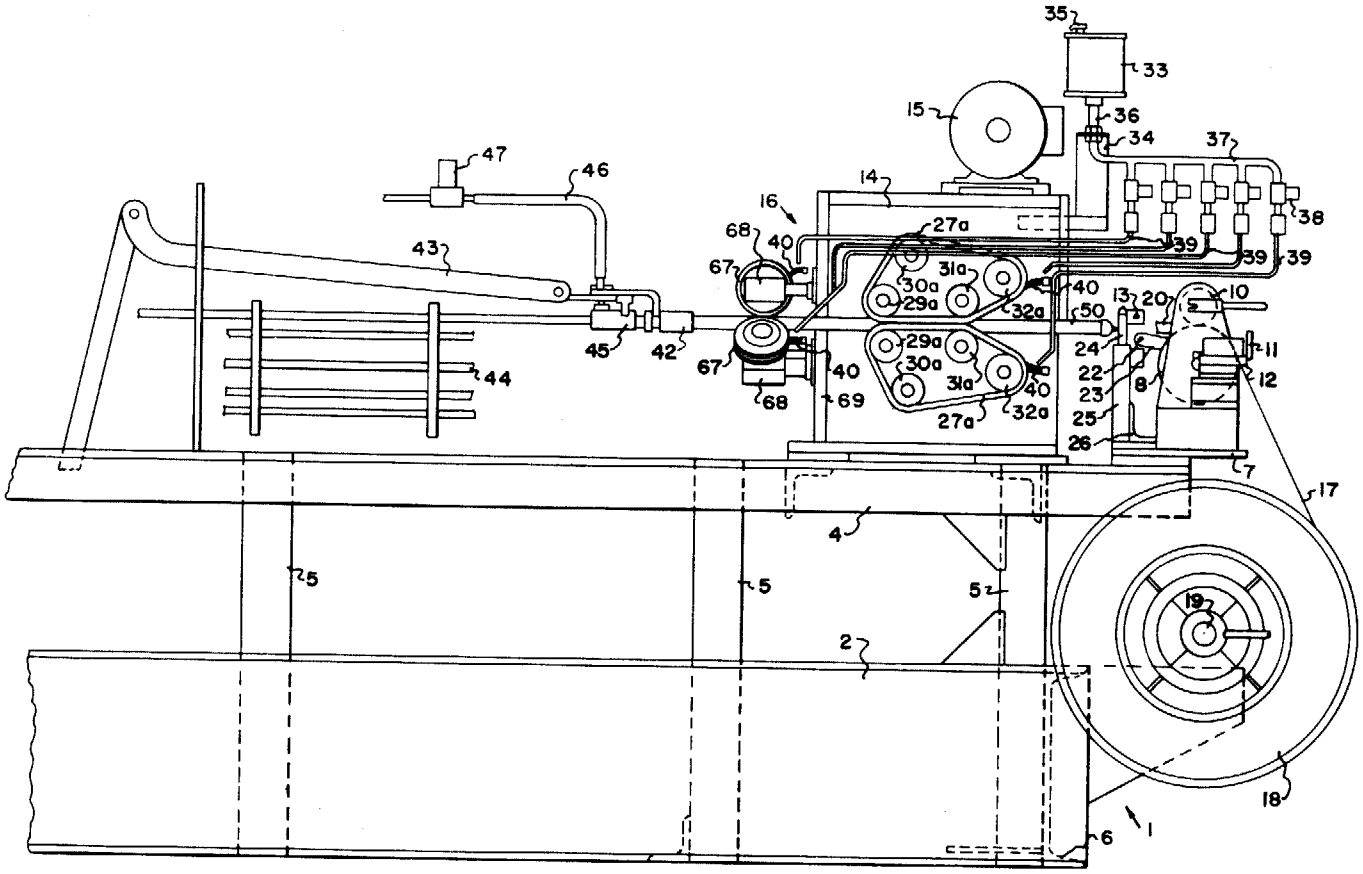
Figure 7:
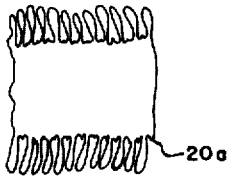
Figure 6:
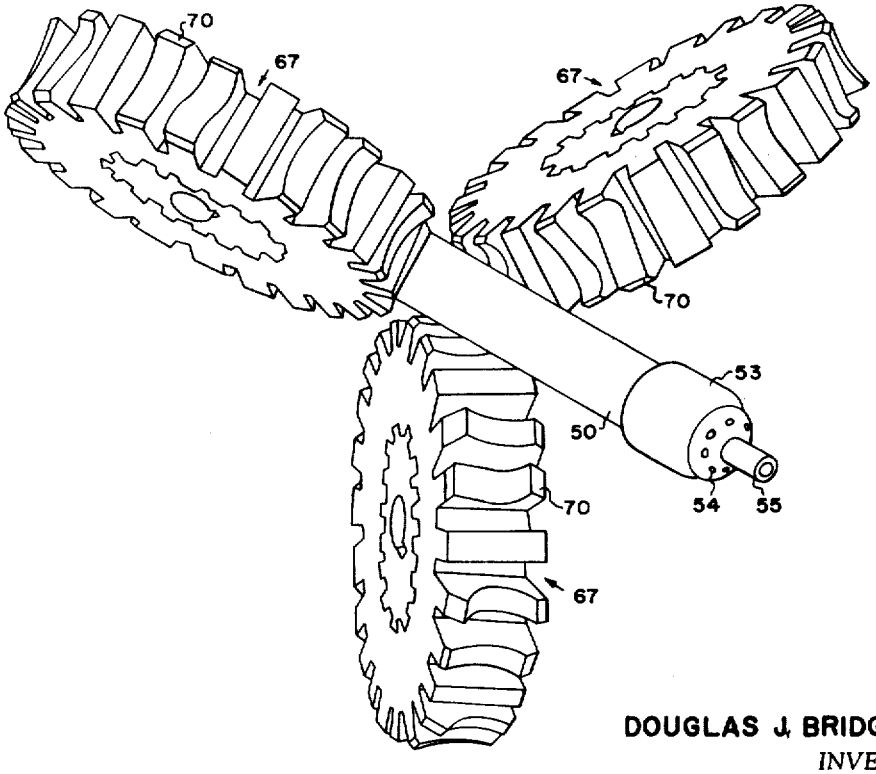

In the accompanying drawings, to be taken as a part of this specification, there are clearly and fully illustrated several preferred embodiments of this invention, in which drawings, FIG. 1 is a view in side elevation of a shirring machine (with much detail omitted) of the type shown in Blizzard et al. U.S. Patents 2,722,714, 2,722,715 and 2,723,201, which may be used for internal coating of hollow tubing or casings in accordance with this invention, FIG. 2 is a view in cross section of a mandrel used in the shirring machine shown in FIG. 1 or in any of the other figures illustrating the application of an internal coating material therethrough, FIG. 3 is a detail sectional view of a modified form of a mandrel shown in FIG. 2, FIG. 4 is still another detail sectional view of another modified form of the mandrel shown in FIG. 2, FIG. 5 is a view in side elevation of a shirring machine of the type shown in FIG. 1, with wheels performing the shirring function, arranged for internal coating of the tube or casing which is to be shirred in the machine, FIG. 6 is a view in perspective of the shirring wheels shown in FIG. 5, and FIG. 7 is a detail view of a strand of shirred casing.

Referring to the drawings by numerals of reference and more particularly to FIG. 1, the improved process of this invention is illustrated as applied to an apparatus of the type shown in Blizzard et al. U.S. Patents 2,722,714, 2,722,715, and 2,723,201. In comparing the apparatus of FIG. 1 with the corresponding figure in the Blizzard et al. patents, the same reference numerals are not used for the same parts shown in that patent, but the correspondence of parts and manner of operation will be apparent. In FIG. 1, the reference numeral 1 is applied generally to an angle iron welded frame which includes a rear bottom longitudinal angle 2, a rear intermediate angle 3, a rear top longitudinal angle 4, and rear upright angles 5. The remaining portions of frame 1 are disclosed in more detail in Korsgaard U.S. Patent 2,583,654, to which reference is made for a more complete understanding of the same.

Frame 1 also includes transversely extending angles 6. Mounted on the rear top angle 4 and on a corresponding angle on the opposite side is plate 7 which carries a measuring roll 8. Measuring roll 8 is rotatably mounted between support plates 9 which also supports a rotatable squeeze roll 10. Cooperating with the measuring roll 8 is a metering disc 11. It is arranged to operate a measuring limit switch 12 for stopping further operation of the shirring head when a predetermined length of casing has been shirred.

In the Blizzard et al. and Korsgaard patents, there is explained in greater detail the employment of a tear limit switch for stopping further operation of the shirring head in the event that the casing or tubing handled in the apparatus is torn. The tear limit switch is operated by roller 13 which engages the upper side of the tubing or casing handled in the apparatus.

On the angle iron frame 1 there are mounted shirring head side plates 14 which constitute the framework for the shirring head. A shirring head motor 15 is mounted on plates 14 and is suitably controlled for starting driving, and stopping the shirring head which is generally referred to as 16.

Shirring head 16 is arranged to receive a relatively thin-walled flexible tubing, such as, sausage casing 17, from reel 18 mounted on shaft 19. The casing 17 which is fed from reel 18 is initially in a flat condition and sometimes referred to reelstock. Casing 17 passes between metering roll 8 and squeeze roll 10 and is inflated as shown at 20. Just beyond the inflated portion 20 the casing is broken away to show more detail of the shirring apparatus and particularly the portion of the apparatus which is used for coating the inside of the casing or tubing. Immediately below roller 13 which operates the tear limit switch and on the underside of inflated casing 20 is roller 22 carried on arm 23. Roller arm 23 is employed to limit the downward movement of roller 13 when the casing is deflated. The casing is drawn over mandrel 50 which has a central longitudinal aperture through which air flows under a slight pressure to inflate the casing to its full diameter and thus facilitate the shirring operation. The mandrel and central aperture are shown in more detail in FIGS. 2 to 4. The central aperture in the shirring mandrel provides an opening for introduction of a coating material and a lubricant, if necessary, into the interior of the casing.

The inflated casing 20 passes over the mandrel 50 into the shirring head 16 between guide rollers 24 which are mounted on vertical supports 25 that are in turn mounted on the ends of arms 26 secured to and extending from plate 7. Using the shirring head 16, constructed as herein disclosed, and with appropriate changes in the openings in the shirring dogs or lugs, it is possible to shirr a wide range of sizes of thin-walled tubes or synthetic sausage casings. Casings or tubings with which this invention can be employed range in thickness from 0.001–010 in. and in length from about 30 to 200 feet. While reel 18 contains an indeterminate length of casing, the casing wound therearound is cut into lengths of the order from 30 to 200 feet, depending upon the end use requirements of the casing or tubing. The resulted lengths of casing are shirred onto the mandrel by shirring head 16 and the shirred casing cut off in predetermined desired lengths. The internal diameter of the casing with which this apparatus can be employed ranges from about ½ to about 2 in. While the apparatus is primarily used in the shirring of thin-walled cellulosic casing, it may be used in the shirring of fibrous casing, amylose or starch film casing, collagen film casing, alginate film casing, thin-walled tubes of various thermo-plastic materials, etc. The shirring head shown in this figure can be used in conjunction with a turret as desribed in the Korsgaard patent, where a floating mandrel construction as described in the Dietrich patent or other similar arrangement is used.

Shirring head 16 includes upper and lower shirring belts 27 which have a plurality of staggered spaced shirring lugs 28 which are offset or staggered in relation to each other. Belts 27 are supported on pulleys or wheels 29, 30, 31 and 32. Motor 15 is connected by a drive pulley or other suitable drive mechanism (not shown) to one of the wheels supporting shirring belt 27 and is operable to drive the belts to shirr the tubing or casing 20. The lower shirring belt 27 is driven by a motor and pulley arrangement which is not shown but which can be seen in FIG. 1 of the Blizzard et al. patent. Upper and lower shirring belts 27 are driven in coordination, with the shirring lugs 28 arranged to engage and shirr casing 20 on shirring mandrel 50. The shirred casing is eventually severed and compressed on a storage mandrel or on the outer end of mandrel 50 where a floating construction is used. After compression, the shirred casing is discharged to a suitable storage hopper where the shirred strand is removed and placed in a box for shipment.

An oil (or other lubricant) storage tank 33 is supported by plates 34 and secured to shirring head plate 14. Storage tank 33 has an inlet opening 35 and a bottom outlet opening connected to tubing 36 which is in turn connected to a manifold 37. Manifold 37 is connected to valve 38 and outlet tubes 39 which are arranged to supply lubricant to brushes 40 positioned for engagement with shirring belts 27. The oil or other lubricant which is placed in storage tank 33 is supplied to brushes 40 for contact with shirring belts 27 and provides lubrication for the external surface of the tubing or casing being shirred to prevent mechanical damage due to shirring abrasion.

Shirring mandrel 50 is provided with collar 42 and actuating arm 43 for reciprocal movement of the mandrel into and out of the shirring head. Actuating member 43 is operated in association with the movement of turret 44 consisting of a plurality of separately actuated and rotatable mandrels as described in Korsgaard Patent 2,583,654. Mandrel 50 is provided with suitable correction indicated at 45 which is connected through flexible tubing 46 to valve 47 for supply of compressed air and liquid for coating the inside surface of tubing or casing being shirred in the machine. Valve 47 is arranged to meter a small amount of a liquid coating material which is to be applied to the inner surface of the tubing or casing being shirred. Valve 47 meters the coating liquid into the stream of air which is used to inflate the casing or tubing during shirring.

In FIG. 2, there is shown a detailed sectional view of mandrel 50 illustrating the introduction of a coating material through the mandrel to coat the inside surface of tubing or casing being shirred in the apparatus. Mandrel 50 comprises hollow tubular portions 48 and 49. Tubular portion 49 is threadedly connected within tubular portion 48 as indicated at 51. Tubular portion 49 is surrounded by sleeve 52 of plastic and abuts against cup shaped cap assembly 53 (also made of plastic). The cap assembly 53 is constructed of two parts and is provided with passages 54 for spraying a coating material. The mandrel is also provided with outlet tube 55 which extends through cap assembly 53 and mandrel portion 49 into outlet passage 56. Tubular mandrel portion 48 is closed by a suitable plug closure 57 and is provided with inlet opening 58 for introduction of air and coating fluid. In the assembly shown in FIG. 1 inlet opening 58 is connected to flexible tubing 46 for introduction of compressed air and the coating fluid.

In operation, the apparatus functions as a shirring machine as described in the Blizzard et al. and Korsgaard patents. Tubular material or casing 17 is drawn from reel 18 and inflated as indicated at 20 by compressed air introduced into the interior of the casing through the hollow interior of mandrel 50. The shirring belts 27 grip the inflated tubing or casing and form it into an accordion pleated or shirred strand. The pleated strand of tubing or casing may be compressed and severed from the unshirred portion of the casing in preparation for storage and shipment. Compressed air is introduced into the interior of the casing through inlet 58 and the passages in tubular mandrel portions 48 and 49 and openings 54 in cap assembly 53. Any desired coating material which is to be applied to the interior surface of the tubing or casing is admixed with the air stream at valve 47 and is blown into the interior of the casing in the form of a spray issuing from openings 54 in the cup shaped cap assembly 53 on mandrel 50. The excess air introduced into the casing is withdrawn, substantially denuded of coating material, through tubes 55 and released to atmosphere through outlet 56. Any of a large variety of coating materials may be admixed with the compressed air introduced through the mandrel 50 as will be subsequently described.

FIGS. 3 and 4 disclose alternate forms of the shirring mandrel 50 designed for improved efficiency in spraying the coating material for application to the entire surface of tubing or casing being shirred in this apparatus. In FIG. 3, the mandrel shown in FIG. 2 is modified by application of a flexible washer member 59 which is of a size and shape suitable for wiping the internal surface of the casing and for restricting the flow of coating material beyond the point of contact with the casing. The operation of the modified mandrel shown in FIG. 3 is identical to that of the mandrel shown in FIG. 2 except that washer 59 restricts the flow of coating material beyond the point of contact with the casing.

In FIG. 4, there is shown a modified form of the mandrel for spraying a coating material within the tubes or casing being shirred in the machine. Mandrel 50 comprises tubular parts 48 and 49 and sleeve member 52 as shown in FIGS. 2 and 3. The cap member 53, however, is provided with tubular extension 59 which is composed of three parts 60, 61 and 62 which are threadedly connected together. Tube 55a extends from inlet opening 56a through the interior of tubular mandrel portions 48 and 49 into the tubular interior of member 60. Member 62 is provided with a spray opening 63 for application of a coating material to the interior of the tubing or casing 20. The mandrel may be provided with a flexible washer 64 shown in dotted lines for lighting the inner surface of tubing 20 to provide an even coating of material therein. The tubular extension 59 is provided with air return openings 65 which permit the withdrawal of air through the bore of tubular mandrel portions 48 and 49 and outlet opening 58a.

The operation of the shirring device for coating the internal surface of a tubing or casing is essentially the same with this modified mandrel as with the mandrel shown in FIGS. 2 and 3. The compressed air and coating material is introduced through inlet opening 56a and tube 55a and sprayed into contact with the inner wall of the tubing or casing through spray outlet 63. Excess air is withdrawn through opening 65 and outlet opening 58a.

In FIG. 5 there is shown a different type of shirring machine for shirring tubing or casing and simultaneously coating the interior thereof. The machine shown in FIG. 5 is substantially the same as that described in FIG. 1 except that shirring wheels have been substituted for the shirring belts 27 and feed belts have been provided for assisting in the conveyance of the inflated tubing or casing to the shirring wheels. In FIG. 5 all of the parts which are the same as in FIG. 1 bear the same reference numerals and the description of the arrangement of such parts will not be repeated. The apparatus is provided with feed-in belts 27a which are supported on and driven by wheels 29a, 30a, 31a and 32a. The feed-in belts 27a are positioned in about the same location as the shirring belts 27 shown in FIG. 1. The apparatus is provided with a set of three shirring wheels 67 (two wheels or four or more wheels could be used, if desired) which are mounted on drive gears 68 which are in turn supported on a vertical support plate 69. In FIG. 6, the shirring wheels 67 are shown in more detail in relation to mandrel 50. The shirring wheels 67 have a plurality of lugs or teeth 70 of different configurations which cooperate to grip tthe casing and shirr it in essentially the same manner as the lugs 28 and the shirring belts 27 in FIG. 1. FIG. 6 also provides an isometric view of the end of mandrel 50 showing the spray outlets 54 and air return tube 55.

In this apparatus, the tubing or casting reelstock 17 is fed from reel 18 and inflated as indicated at 20. The inflated casing passes over mandrel 50 and is conveyed by feed-in belts 27a to shirring wheels 67. Compressed air and the coating material for application to the inner surface of tubing or casing 17 is introduced through valve 47 and inlet tubing 46 to the interior of mandrel 50 as described in connection with FIGS. 1 to 4. The casing is lubricated externally by oil or other lubricant supplied from reservoir 33 through manifold 37 to brushes 40 which apply lubricant to the feed-in belts and to the shirring wheels. The casing is shirred into a tightly compacted accordion pleated form as shown by a section of shirred casing 20a in FIG. 7. The casing in this form is provided with a uniform inner coating of whatever coating material was introduced with the compressed air through the shirring mandrel. As described in connection with FIG. 1, the casing is severed after shirring to a predetermined length and is transferred to other receiving mandrels on a turret 34 where the casing is further compressed and eventually discharged to a storage hopper in preparation for packaging.

In carrying out the novel process of this invention, the desired coating material is introduced into the interior of the thin-walled tubing or casing with compressed air introduced througha shirring mandrel. The casing is shirred into an accordion pleated form as shown in FIG. 7 and has a uniform coherent coating on the entire internal surface thereof. The types of coatings which may be applied in this manner include such materials as synthetic smokes (for applying a smoke flavor to sausages prepared in the casings), antibiotics or bacteristats (for preservative purposes), perfumes, dyes, pigments, release agents, etc. The coating materials may be applied as is, *i.e., neat,* where liquid coatings are used, or in the form of aqueous or nonaqueous solutions, emulsions, latices, dispersions, and the like. Reactive materials may also be applied as internal coatings in this process. Suitable materials include fatty ketene dimers in the form of emulsions or mineral oil solutions or suspensions, isocyanates, ethylene imine, etc. In evaluating the effectiveness of this internal coating process, a large variety of coating materials were used.

Example I

Solutions or suspensions in a concentration range from 0.2 to 2% were prepared in (1) food grade mineral oil, (2) an edible vegetable oil, and (3) twelve percent glycerol solution in water, using the following materials as the solute or dispersed phase for coating the inside of casing or tubing:

85% lactic acid
Calcium lactate
Trisodium hexametaphosphate
Aluminum sulfate
Potassium aluminum sulfate
Lecithin diammonium phosphate
Carboxy methylcellulose
Silicone oil
Calcium phytate
Inositol
Glycerophosphoric acid
C–16—C–18 fatty ketene dimers
Acetylated monoglycerides of animal and vegetable fats
Methyl cellulose
Cetyl alcohol
Stearato chromyl chloride These solutions or suspensions were introduced into the interior of regenerated cellulose casings during the shirring of the casing on shirring machines as described in FIGS. 1 to 5. The coating solutions were introduced through the interior of the shirring mandrel along with the compressed air used to inflate the casings during shirring. In each case a shirred casing was obtained having a coherent uniformly dispersed coating over the entire inner surface of this casing. The casings which were coated in this manner were with cetyl alcohol, lecithin, fatty ketene dimers, methocel, silicone oil, or stearato chromyl chloride and were found to be more easily peeled from sausages which were stuffed into the casing.

Example II

It has been found that reactive materials such as tolylenediisocyanate, octadecylisocyanate, and fatty ketenes dimers can be coated on the inside of cellulose tubes (casings) to provide hydrophobic coatings which reduce the rate of water uptake by the cellulose. In the case of cellulose casing, the reduced rate of water uptake provides a substantial increase in strength during the time that the casing is stuffed with sausage emulsion.

Solutions or dispersions were prepared of (1) 5% octadecyl isocyanate in mineral oil, (2) 5% tolylene diisocyanate emulsified in water with lauryl sodium sulfate, and (3) 10% $C_{16-18}$ fatty ketene dimer in mineral oil. These solutions were used to coat the inside of cellulose casings using the apparatus shown in FIG. 5.

The coated casings were rewet and inflated with compressed air until they burst. It required 18 seconds inflation to burst the coated samples as compared to 10 sec. to burst an uncoated, rewet, control.

Example III

A mandrel as shown in FIG. 4 was used in the apparatus of FIG. 5 for coating cellulose casing with octadecyl isocyanate. A solution of 10% octadecyl isocyanate in mineral oil was applied at the rates of (1) 30 drops per 84 ft. strand and (2) 90 drops per 84 ft. strand. Control strands were also prepared by applying mineral oil without the isocyanate to casing at the same rates, i.e. 30 drops and 90 drops per 84 ft. strand. The strands were rewet by application of water internally and tested in the inflation burst test of a 20 in. length, as follows:

TABLE

| | Burst, p.s.i. | |
|---|---|---|
| | Control | Isocyanate coating |
| 30 drops/strand | 9.6 | 12.7 |
| 90 drops/strand | 10.2 | 15.8 |

It was further noted that the application of water to the exterior of the isocyanate coated casings resulted in a substantial reduction in strength.

Example IV

An experiment similar to Example III was carried out in which cellulose casing was coated with 10% $C_{16-18}$ fatty ketene dimer in mineral oil at a rate of 90 drops per 84 ft. strand. The rewet burst strength was 12.0 p.s.i., compared to 10.2 p.s.i. for the control.

Example V

Additional experiments were carried out in which 3,3'-bitolylene 4,4'-diisocyanate were dissolved or dispersed in acetone, toluene, perchloroethylene, carbon tetrachloride, ethylene dichloride, acetonitrile, cyclohexane, [diosopropyl] *diisopropyl* ether, or dioxane at a concentration of 0.2%. These solutions or dispersions were used to coat the inside of cellulose casings using the apparatus as previously described. The diisocyanate reacts with the inner surface to form an inner coating or sheath which is hydrophobic and slows down the wet out rate for the cellulose.

While the operation of this invention has been described using various solutions as coating materials, it will be obvious to those skilled in the art that any liquid coating material could be applied to the inner surface of the casing using this process. Likewise, it would be possible to apply a solid particulate material to the inner surface of the casing or tubing to provide an anti-blocking coating. The process has been described as being carried out in several different shirring machines. It will be obvious to those skilled in the art that the process could be carried out in any shirring machine having a hollow mandrel through which the coating material could be applied. Likewise, the process could be carried out by application through a hollow shirring mandrel where the tubing or casing as shirred by hand onto the mandrel. The process was described as one in which the coating material is sprayed into the interior of the tubing or casing in advance of or during shirring. It will be obvious to those skilled in the art that the coating material may be applied by any suitable method of application through the hollow shirring mandrel. Thus, the [coated] *coating* material may be sprayed into the interior of the casing or tubing or may be applied through a wick or suitable wiping member which would apply the coating to the inner wall of the tubing. *In the general description above, it is noted that this invention is applicable to coating the interior of a variety of sausage casings, e.g., regenerated cellulose, both plain and fibrous reinforced; amylose or starch casings; alginate film casings; collagen casings; and the tubular thermoplastic film casings. Casing may be from 30–200 feet in length, 1–10 mils in thickness, and 0.5–2.0 inches in diameter. In Examples III and IV the coating materials were added at a level of 30–90 drops per 84 foot shirred strand. The various coating materials may be dissolved or dispersed in various liquids, including water, oils, such as mineral oil and vegetable oil, organic solvents such as acetone, toluene, perchloroethylene, carbon tetrachloride, ethylene dichloride, acetonitrile, cyclohexane, diisopropyl ether or dioxane, and mixtures such as solutions of glycerol in water. Coating materials which are not soluble may be dispersed in a liquid carrier using any suitable surfactant, e.g., sodium lauryl sulfate.*

What is claimed is:

1. A method of coating the interior of a sausage casing of indefinite length which comprises shirring the casing on a mandrel having a longitudinal passage while introducing a coating composition comprising a solution, emulsion, or dispersion of an adherent coating material in a liquid carrier through said passage to coat the interior of the casing.

2. A method in accordance with claim 1 in which said tube is inflated by gas introduced through said mandrel, and said coating composition is introduced in admixture with said gas.

3. A method in accordance with claim 2 in which the coating material is sprayed into the tube through the mandrel.

4. A method in accordance with claim 1 in which said adherent coating material is lactic acid, calcium lactate, trisodium hexametaphosphate, aluminum sulfate, potassium aluminum sulfate, lecithin diammonium phosphate, carboxy methyl [celulose] *cellulose*, silicone oil, calcium phytate, inositol, glycero-phosphoric acid, $C_{16}$–$C_{18}$ fatty ketene dimers, acetylated monoglycerides of animal or vegetable fats, methyl cellulose, cetyl alcohol, or an organic isocyanate and said liquid carrier is a [good] *food* grade mineral oil or an edible vegetable oil.

*5. A method in accordance with claim 1 in which said casing is of regenerated cellulose, fibrous reinforced regenerated cellulose, amylose, starch, alginate, collagen, or thermoplastic film.*

*6. A method in accordance with claim 1 in which said liquid carrier is water or an organic liquid.*

*7. A method in accordance wth claim 6 in which said liquid carrier is water, mineral oil, vegetable oil, acetone, toluene, perchloroethylene, carbon tetrachloride, ethylene dichloride, acetonitrile, cyclohexane, diisopropyl ether, dioxane, glycerol, or aqueous glycerol.*

*8. A method in accordance with claim 1 in which said coating liquid is applied at a coating addon of about 30–90 drops per 84 foot shirred strand.*

*9. A method in accordance wth claim 6 in which said coating liquid is applied at a coating addon of about 30–90 drops per 84 foot shirred strand.*

*10. A method in accordance with claim 9 in which said coating material is insoluble and is dispersed in admixture with a surfactant.*

References Cited

The following references, cited by the Examiner, are of record in the patented file of this patent or the original patent.

UNITED STATES PATENTS

| | | | |
|---|---|---|---|
| 3,097,393 | 7/1963 | Matecki | 99—176 |
| 3,222,192 | 12/1965 | Arnold et al. | 99—176 |
| 3,266,911 | 8/1966 | Clement | 99—176 |
| 3,209,398 | 10/1965 | Ziolko | 99—176 X |
| 3,360,383 | 12/1967 | Rose et al. | 99—176 |
| 3,361,577 | 1/1968 | Simon et al. | 99—176 X |

MORRIS O. WOLK, Primary Examiner

S. MARANTZ, Assistant Examiner

U.S. Cl. X.R.

138—118.1; 426—105, 135, 420